United States Patent [19]
Cox

[11] 4,079,864
[45] Mar. 21, 1978

[54] MANIFOLD FOR LIQUID DISPENSING APPARATUS

[76] Inventor: James R. Cox, 1816 Lawndale Dr., Fort Wayne, Ind. 46805

[21] Appl. No.: 750,812

[22] Filed: Dec. 15, 1976

[51] Int. Cl.² .............................................. B67D 5/52
[52] U.S. Cl. .................................... 222/255; 222/334; 184/29; 184/6.28
[58] Field of Search ....................... 222/255, 334, 330; 184/29, 6, 6.28, 7 D, 15 A, 5

[56] References Cited

U.S. PATENT DOCUMENTS

| | | | |
|---|---|---|---|
| 754,486 | 3/1904 | McCanna | 184/29 X |
| 1,742,446 | 1/1930 | Manzel | 184/7 D |
| 1,753,460 | 4/1930 | Garbarino | 184/7 C |
| 3,809,184 | 5/1974 | Smith et al. | 184/7 D |

*Primary Examiner*—Allen N. Knowles
*Attorney Agent or Firm*—Gust, Irish, Jeffers & Rickert

[57] ABSTRACT

A manifold for use in conjunction with fluid actuable liquid dispensing apparatus is disclosed for supporting and interconnecting such apparatus, especially where numerous individual liquid dispensers are employed, for example for lubricating various points in a system. The manifold allows individual dispensers, or sets of dispensers, to be disabled, for example for repair purposes, while others may continue to operate. Several such manifolds would typically be employed in a lubricating system with each comprising a block having a plurality of separated passageways therein, including at least one actuating fluid passageway with an inlet for connection to an actuating fluid source, and an outlet for connection to the liquid dispensing device, and at least a second passageway for the liquid to be dispensed, again having an inlet for connection to a liquid source, and an outlet for connection to the liquid dispensing device. An elongated generally cylindrical manually operable valve is disposed in the block for selectively opening and closing at least one, and preferably both, of the passageways, to enable or disable the particular dispensing devices associated with that manifold block. Each manifold block is typically configured as a rectangular parallelepiped, with the inlets communicating with a first face thereof, and the dispensing device outlets communicating with a second adjacent face thereof. A third face parallel to the first face includes outlets allowing juxtaposition of several blocks with alignment of the same named inlets and outlets in parallel faces supplying liquid and air to the several blocks from a common source.

7 Claims, 3 Drawing Figures

MANIFOLD FOR LIQUID DISPENSING APPARATUS

BACKGROUND OF THE INVENTION

The present invention relates generally to manifolds for the interconnection and control of fluid actuable devices and more particularly to such manifolds which may be concatenated to supply a plurality of fluid actuable liquid dispensers while still providing individual control for each such liquid dispenser.

Pneumatically actuated lubricating systems are known and may be constructed in accordance with the general teachings of U.S. Pat. Nos. 3,421,600 and 3,389,799. Such systems have as their basic element an air operated injector device, for example of the type commercially available from Master Pneumatic-Detroit, Inc. In such positive displacement lubrication systems oil is supplied, normally by gravity flow, from a reservoir or central oil supply system, to the individual air operated injectors. When an air pulse is applied to an air inlet of the injector, a piston is actuated driving an oil metering pin into an oil metering chamber, and oil is thereby dispensed through a check valve from that chamber as the piston continues its motion. When the air pulse is removed, the oil metering pin, under spring action, returns to its original position. Piston stroke is typically adjustable to determine the amount of oil dispensed for each cycle of the injector.

Such commercially available air operated injectors frequently have air and oil inlet ports which extend completely through the injector, thereby allowing a number of such injectors to be stacked together with intervening gasket material, so that the entire stack of injectors may be actuated by a single air source to perform their individual oiling functions. With such a stack of injectors, individual injectors can not be easily disabled or shut off, and the number of such injectors which may be stacked and simultaneously actuated is limited to about ten such injectors. Mounting blocks to be placed adjacent the uppermost and lowermost injector in such a stack are commercially available for facilitating connection of the oil and air supply lines to the stack, and for sealingly closing the unused ports at the opposite ends of the stack. Such mounting blocks do not even provide for control of the stack of injectors, let alone control of individual injectors.

SUMMARY OF THE INVENTION

Among the several objects, features and advantages of the present invention may be noted the provision of a valved manifold for a pneumatically actuated dispenser having separated control and dispensed material passageways therein; the provision of a plurality of substantially identical manifold blocks which may be linked together to form an air actuable lubricating system wherein individual lubricant dispensers may be disabled or removed from the system without interrupting operation of the entire system; the provision of a manifold for use in conjunction with fluid actuable liquid dispensing apparatus which allows stacking of the dispensers and coupling thereof to common sources while maintaining individual control of those dispensers. The foregoing, as well as other objects and advantageous features, will be in part apparent, and in part pointed out, hereinafter.

In general, the manifolds of the present invention in one form include a block, having a plurality of separated passageways therein, including at least actuating fluid passageway, having an inlet for connection to an actuating fluid source and an outlet for connection to the liquid dispensing apparatus, and at least one passageway for a liquid to be dispensed, having an inlet for connection to a liquid source, and an outlet for connection to the liquid dispensing apparatus. A manually operable valve is disposed in the block for selectively opening and closing at least one of the passageways, and preferably simultaneously controlling both the dispensed liquid passageway and the actuating fluid passageway. In one preferred form, the passageways extend completely through the blocks, allowing concatenation of several blocks with their respective passageways aligned, so that the series of blocks may be coupled to single dispensed liquid and actuating fluid sources. With this concatenated arrangement, individual valves obstruct only the outlets which communicate with the individual dispensing devices.

BRIEF DESCRIPTION OF THE DRAWING

Corresponding reference characters indicate corresponding parts throughout the several views of the drawing.

The exemplification set out herein illustrates the preferred embodiments of the invention in one form thereof, and such exemplifications are not to be construed as limiting the scope of the disclosure or the invention in any manner.

DETAILED DESCRIPTION OF THE PREFERRED EMBODIMENT

Figure 1:
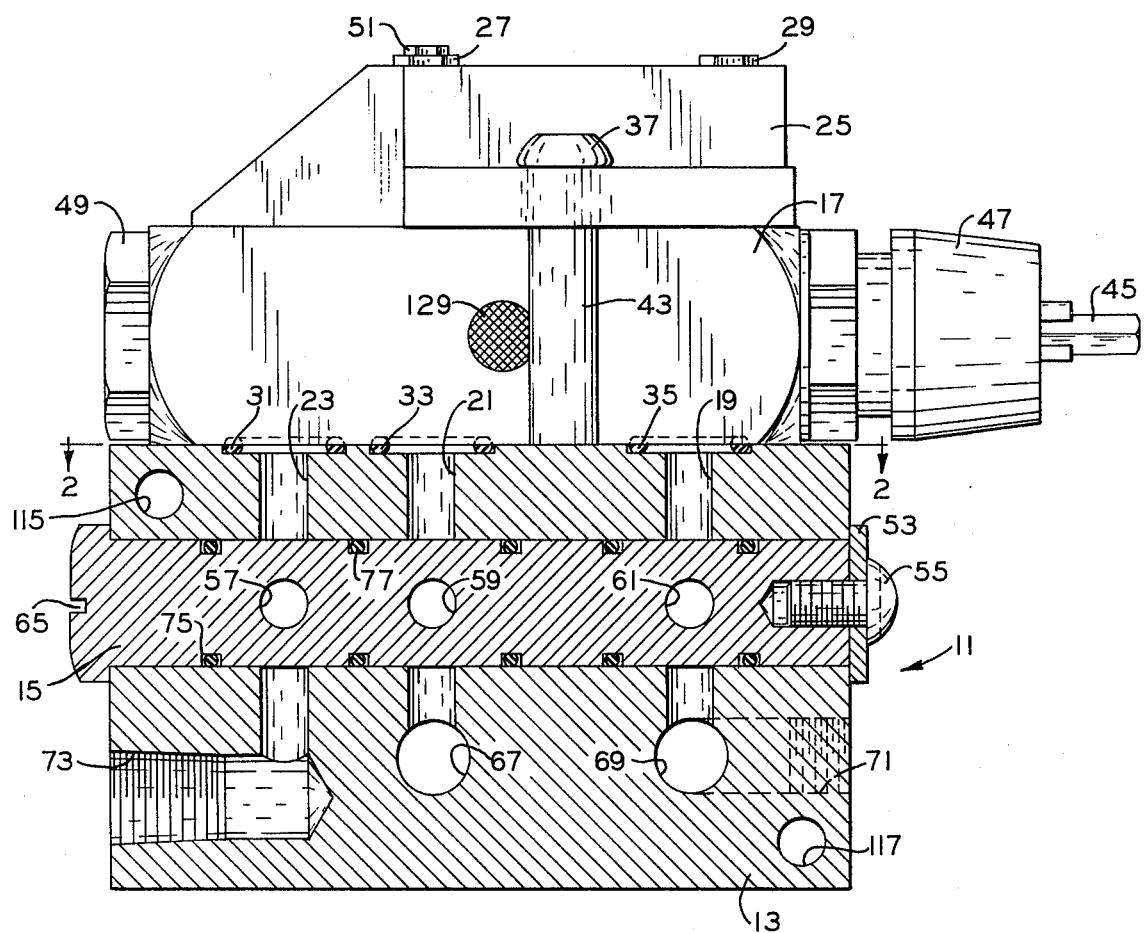
FIG. 1 is a side view of a dispenser mounted on an individual manifold with the manifold illustrated in cross-section.

In FIG. 1, 11 illustrates generally the manifold having a plurality of separated passageways, which manifold includes a block 13, generally in the form of a rectangular parallelepiped, and containing an elongated generally cylindrical valve spool 15 for simultaneously opening and closing the three illustrated vertical passageways.

The air operated injector, or dispenser 17, may be of the aforementioned commercially available type, having three openings in the bottom thereof, communicating with the respective passageways 19, 21 and 23, and having a pair of corresponding openings in the top thereof, communicating through passageways in the mounting block 25, which are respectively blocked in plugs 27 and 29. Coupling to the injector 17 is completed by O-rings, such as 31, 33 and 35, which when the injector 17 and mounting block or cap 25 are fastened by way of bolts, such as 37, to threaded holes 39 and 41 in the block, are compressed to sealingly connect passageways 19, 21 and 23 to the injector 17. The mounting arrangement may further include a sleeve like spacer or washer 43 through which bolt 37 passes.

The injector 17 includes a piston, having a rod portion 45 extending from the injector for manual operation and the distance traveled by the piston is determined by the angular setting of a control knob 47. The piston is actuated by air pressure in passageway 19 to take a measured volume of oil as supplied through passageway 21 and force that quantity of oil into passageway 23. The commercially available injector also includes a dispensed oil opening near the rear end thereof, which in the present implementation may be blocked by a threaded sealing cap 49. Plug 27 may additionally comprise a second plug 51 for bleeding air from the oil supply passageway 21, as desired.

The manifold body 13 contains an elongated generally cylindrical valve spool 15, held within the body 13 by a washer 53, and screw 55. The spool 15 has transverse apertures 57, 59 and 61 of approximately the same diameter as the passageways 23, 21 and 19, respectively. In the position illustrated, the spool 15 blocks fluid flow through these three passageways, however, when the spool 15 is rotated approximately ninety degrees, for example by manually engaging the hexagonal head 63, or the screwdriver slot 65 therein, the valve spool may be moved to its fluid passing position. With the valve open, oil is supplied to the injector 17 by way of passageway 67, and air or other control fluid is selectively applied to actuate the injector 17, by way of passageway 69. An optional forward extending passageway 71 for air control purposes may be provided in the block 13 and measured quantities of lubricating oil may be dispensed by the injector 17 by way of passageway 73. The spool 15 is provided with a series of annular grooves, such as 75, containing O-rings or other sealing elements, such as 77, to prevent leakage from one passageway to another, or to the outside of the manifold.

Figure 2:
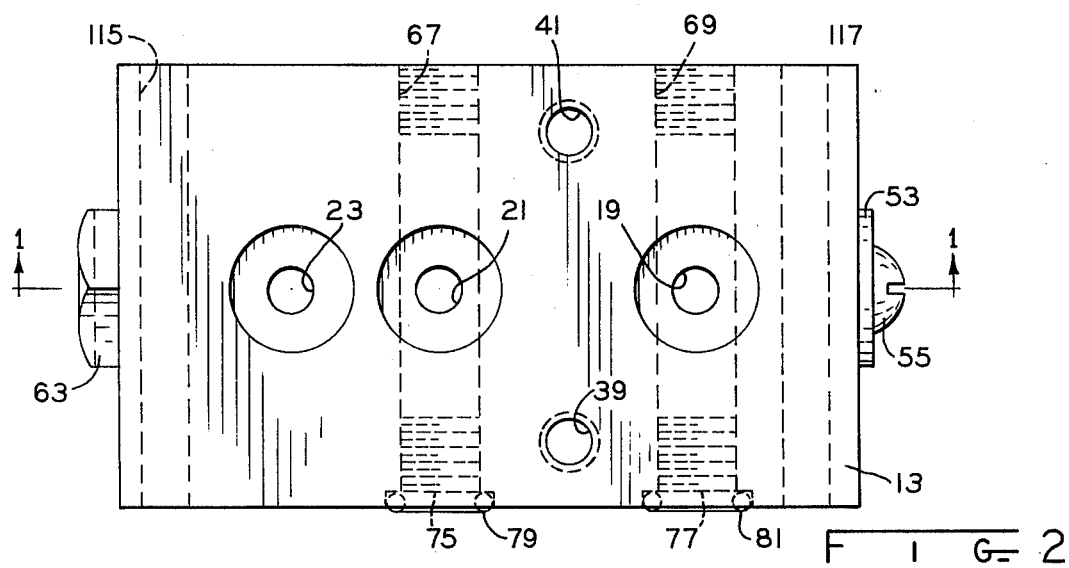
FIG. 2 is a sectional view along the line 2—2 of FIG. 1 illustrating the top surface of the manifold block.

In FIG. 2 it will be noted that the passageways 67 and 69 communicate with opposed faces of the manifold block, and that associated with the passageway portion communicating with one said face, there are a pair of grooves 75 and 77 for accepting a sealing element, such as the annular O-rings 79 and 81. With these O-rings maintained in the respective grooves, the juxtaposition of a pair of manifold blocks with their respective passageways 67 and 69 in alignment, compresses the respective O-rings to provide a sealing communication between passageways of the adjacent blocks. Clearly, several such blocks may be juxtaposed with O-rings therebetween, and such a series is illustrated in FIG. 3.

Figure 3:
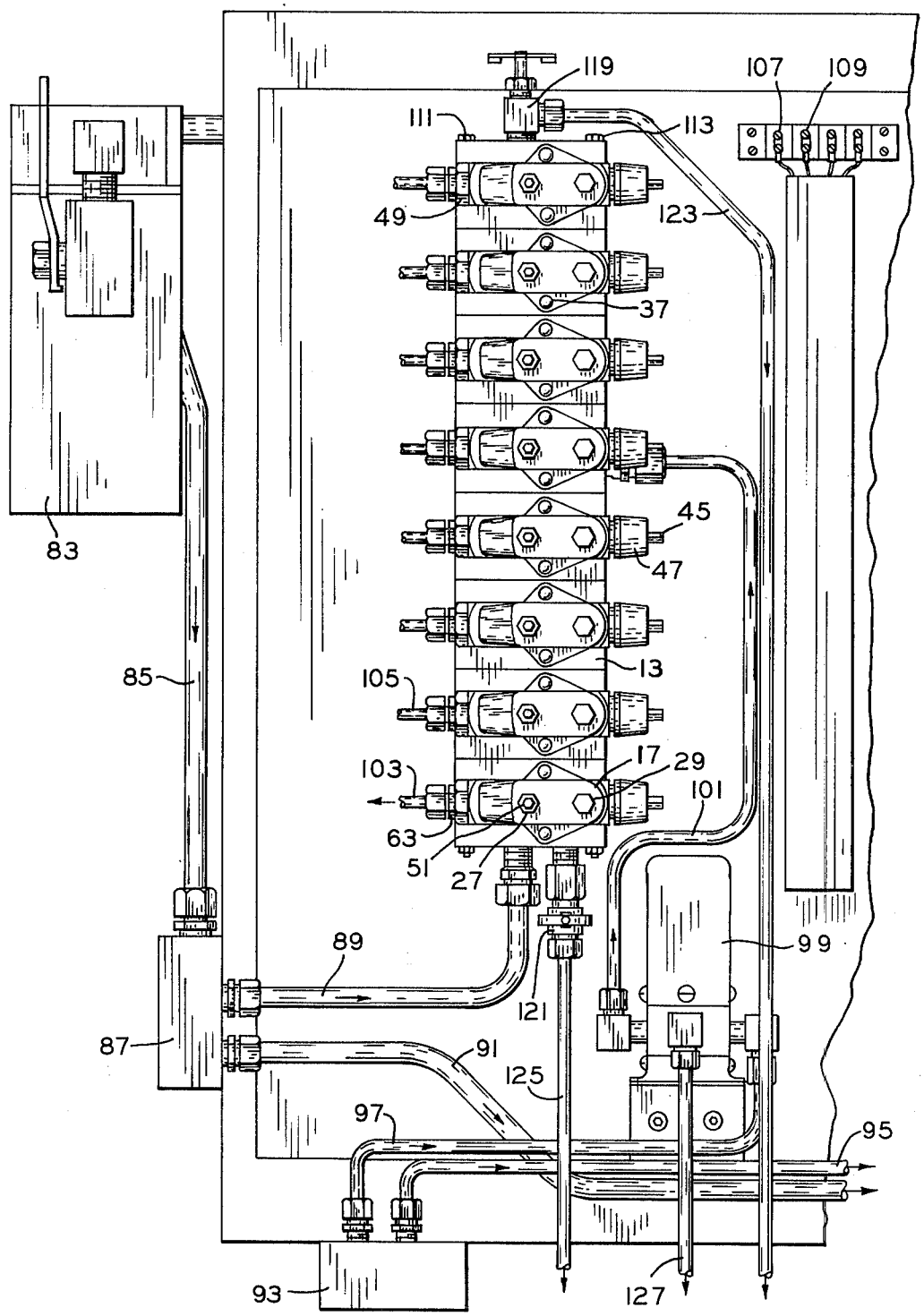
FIG. 3 illustrates in somewhat schematic form an air actuated oil distribution system employing manifolds of the type illustrated in FIGS. 1 and 2.

FIG. 3 illustrates one bank of, for example two or more banks, to be employed in lubricating a pneumatic system. In FIG. 3 injectors for the lubrication of eight points in that system are illustrated. The illustrated system can provide metered lubrication, for example of a programmed frequency, to multiple points, which metered quantity of lubricant is not dependent on such previous parameters as air velocity, gravity, pipe sizes and distances, and the like. In one preferred example, the system illustrated in FIG. 3 is disposed with the top of the drawing upwardly for the easy bleeding of moisture from the air lines and air from the oil lines.

In FIG. 3 a liquid source 83 of, for example a lubricating oil, supplies that oil by way of conduit 85 to a lubricant inlet manifold 87, by way of conduit 89, to the several air operated injectors illustrated, and by way of conduit 91 to other liquid dispensing apparatus, as desired. A common air source 93 supplies air via conduit 95 to other equipment, if present, and by way of conduit 97, to an electro-pneumatic control element 99, such as a Humphrey valve which functions to gate that air supply either periodically or on command to conduit 101, which is connected to the several manifold block passageways 69, for example by threading into a representative one of those blocks at 71 in FIG. 1. Similarly, the oil supply line 89 communicates with the several block passageways 67, and each individual block has its metered oil outlet 73 connected to a conduit, such as 103, and 105, for distribution of the lubricant to the desired locations.

Electro-pneumatic control 99 may be enabled to supply air under pressure to conduit 101, for example by signals on electrical terminals 107 and 109. Such signals might occur once each time a part is produced or periodically, in accordance with a timer, depending on the system involved. Air pressure on line 101 simultaneously actuates each of the injectors 17 to dispense a metered amount of lubricant at its output 103 or 105. The several manifolds may be connected in the concatenated manner illustrated by long bolts 111 and 113 passing through the holes 115 and 117 of FIG. 1.

Normally closed petcocks 119 and 121 are also illustrated in FIG. 3. Petcock 119 being substantially the uppermost element in the oil system may be opened to bleed air from the oil line by way of conduit 123. Similarly, petcock 121 being nearly the lowermost element in the air system associated with the bank of manifolds illustrated may be opened to drain moisture from that bank by way of conduit 125. Air exhaust or air pressure equalizing ports, such as 127 and 129, may be provided as dictated by good design choice, along with other oil supply strainers, valves and oil check valves, where necessary.

From the foregoing it is now apparent that a novel valved manifold, as well as a novel system employing a series of such manifolds, has been described meeting the objects and advantageous features set out herein as well as others, and it is contemplated that changes as to the connections, components and construction may be made by those having ordinary skill in the art, without departing from the spirit of the invention or the scope thereof as set out by the claims which follow.

What is claimed is:

1. A manifold for use in conjunction with fluid actuable liquid dispensing apparatus comprising: a block having a plurality of separated passageways therein including at least one actuating fluid passageway having an inlet for connection to an actuating fluid source and an outlet for connection to the liquid dispensing apparatus, at least one passageway for a liquid to be dispensed having an inlet for connection to a liquid source and an outlet for connection to the liquid dispensing apparatus, and a second actuating fluid passageway outlet and a second dispensed fluid passageway outlet for connection respectively to the same named inlets of another manifold block whereby a plurality of manifold blocks may be connected together to common sources; and manually operable valve means disposed in the block for selectively opening and closing at least one of the passageways, the valve means operable to open and close both the passageway for a liquid to be dispensed and the actuating fluid passageway with the passageways between the inlets and respective second outlets being independent of the valve means.

2. The manifold of claim 1 wherein the block is generally configured as a rectangular parallelepiped, both the said inlets communicating with a first face thereof and both the said second outlets communicating with a second face thereof disposed opposite and parallel to the said first face.

3. The manifold of claim 4 including means for mounting a liquid dispensing device to a third face of the block.

4. The manifold of claim 3 wherein the said actuating fluid passageway and dispensed liquid passageway outlets communicate with the said third face of the block.

5. The manifold of claim 2 wherein at least one of the first and second faces includes means associated with the passageway portion communicating therewith for accepting and maintaining a sealing element.

6. The manifold of claim 5 further comprising an annular sealing element disposed in the means for accepting, juxtaposition of a pair of manifold blocks compressing the sealing element and forming a sealed connection between an inlet of one of the blocks and a said second outlet of the other block.

7. The manifold of claim 1 wherein the valve means comprises an elongated generally cylindrical member passing through the body and intercepting the at least one passageway, the cylindrical member having a transverse aperture therethrough alignable with the at least one passageway by rotation of the cylindrical member about its axis.

* * * * *

UNITED STATES PATENT AND TRADEMARK OFFICE
CERTIFICATE OF CORRECTION

PATENT NO. : 4,079,864
DATED : March 21, 1978
INVENTOR(S) : James R. Cox

It is certified that error appears in the above–identified patent and that said Letters Patent are hereby corrected as shown below:

Claim 3, line 1, "4" should read ---2---.

Signed and Sealed this

Twenty-fifth Day of July 1978

[SEAL]

Attest:

RUTH C. MASON
*Attesting Officer*

DONALD W. BANNER
*Commissioner of Patents and Trademarks*